United States Patent
Kwak et al.

(10) Patent No.: US 9,716,261 B2
(45) Date of Patent: Jul. 25, 2017

(54) RECHARGEABLE BATTERY

(71) Applicant: SAMSUNG SDI CO., LTD., Yongin-si, Gyonggi-do (KR)

(72) Inventors: Yoon-Tai Kwak, Yongin-si (KR); Yup Hwangbo, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 153 days.

(21) Appl. No.: 14/228,758

(22) Filed: Mar. 28, 2014

(65) Prior Publication Data

US 2015/0017520 A1   Jan. 15, 2015

Related U.S. Application Data

(60) Provisional application No. 61/845,662, filed on Jul. 12, 2013.

(51) Int. Cl.
| | | |
|---|---|---|
| *H01M 2/04* | (2006.01) | |
| *H01M 2/20* | (2006.01) | |
| *H01M 2/26* | (2006.01) | |
| *H01M 2/30* | (2006.01) | |

(52) U.S. Cl.
CPC ......... *H01M 2/202* (2013.01); *H01M 2/0473* (2013.01); *H01M 2/266* (2013.01); *H01M 2/30* (2013.01); *H01M 2/043* (2013.01); *H01M 2/0404* (2013.01); *H01M 2/0486* (2013.01)

(58) Field of Classification Search
CPC .... H01M 2/202; H01M 2/0473; H01M 2/266; H01M 2/30
See application file for complete search history.

(56) References Cited

U.S. PATENT DOCUMENTS

| | | | |
|---|---|---|---|
| 2006/0099499 A1 | 5/2006 | Kim et al. | |
| 2008/0274402 A1* | 11/2008 | Uh ...................... | H01M 10/058 429/174 |
| 2011/0064996 A1* | 3/2011 | Park .................... | H01M 2/0404 429/185 |

FOREIGN PATENT DOCUMENTS

| | | | |
|---|---|---|---|
| DE | 2036 158 A1 | 2/1971 | |
| DE | 20 2012 007 958 U1 | 12/2012 | |
| JP | 10-144268 A | 5/1998 | |
| JP | 2013-0093208 A | 5/2013 | |
| KR | 10-2000-0051258 A | 8/2000 | |
| KR | 10-2006-0013936 A | 2/2006 | |
| KR | 1020070088897 A * | 8/2007 | .............. H01M 2/10 |
| KR | 10-0795680 B1 | 1/2008 | |

OTHER PUBLICATIONS

Extended European Search Report dated Nov. 21, 2014 for EP14162623.4; Kwak, et al.
European Search Report dated Nov. 15, 2016 for EP 14162623.4.

* cited by examiner

*Primary Examiner* — Muhammad Siddiquee
(74) *Attorney, Agent, or Firm* — Lee & Morse, P.C.

(57) ABSTRACT

Disclosed is a rechargeable battery including an electrode assembly and a housing for the electrode assembly. The housing includes a case having an opening therein, the opening exposing case sides the case configured to receive the electrode assembly through the opening and a cap plate to seal the case at the opening. The cap plate includes cap plate sides corresponding to the case sides, the case sides facing and contacting the cap plate sides at first and second contact regions, respectively, the first and second contact regions being asymmetric to each other.

15 Claims, 12 Drawing Sheets

RECHARGEABLE BATTERY

CROSS-REFERENCE TO RELATED APPLICATION

The present application claims priority under 35 U.S.C. §119 to U.S. Provisional Application No. 61/845,662, filed on Jul. 12, 2013, and entitled: "Rechargeable Battery," which is incorporated herein by reference in its entirety.

BACKGROUND

1. Field

The present description relates to a rechargeable battery in which a cap plate is fastened to a case.

2. Description of the Related Art

A rechargeable battery is a battery repeatedly performing charging and discharging unlike a primary battery. A rechargeable battery having a small capacity may be used in a portable small electronic device such as a mobile phone, a laptop computer, and a camcorder. A rechargeable battery having a large capacity may be used as a power source for driving a motor of hybrid and electric vehicles.

For example, the rechargeable battery includes an electrode assembly performing charging and discharging, a case receiving the electrode assembly and an electrolyte solution, a cap plate fastened to an opening of the case, and an electrode terminal provided in the cap plate to be electrically connected to the electrode assembly. However, there are issues with safely seating the cap plate in the case.

The above information disclosed in this Background section is only for enhancement of understanding of the background of the disclosure and therefore it may contain information that does not form the prior art that is already known in this country to a person of ordinary skill in the art.

SUMMARY

One or more embodiments are directed to a rechargeable battery including an electrode assembly and a housing for the electrode assembly. The housing includes a case having an opening therein, the opening exposing case sides the case configured to receive the electrode assembly through the opening, and a cap plate to seal the case at the opening. The cap plate includes cap plate sides corresponding to the case sides, the case sides facing and contacting the cap plate sides at first and second contact regions, respectively, the first and second contact regions being asymmetric to each other.

The case may be a cuboid and the cap plate may be a quadrangle, wherein the first and second opposing case sides and the first and second opposing cap plate sides are short lateral sides.

The first and second contact regions may include first and second features in the first and second opposing cap plate sides.

The first and second contact regions may include corresponding first and second features in the first and second opposing case sides, the first and second corresponding features in the first and second opposing case sides mating with the first and second features in the first and second opposing cap plate sides.

A fastening margin of the first contact region may be larger than a fastening margin of the second contact region.

The first contact region may include a first inclined unit and the second contact region includes a second inclined unit.

The first inclined unit may be in the first opposing case side and the second inclined unit may be in the second opposing case side.

The first contact region may include a first corresponding inclined unit in the first opposing cap plate side and the second contact region may include a second corresponding inclined unit in the second opposing cap plate side.

A first inclination angle of the first inclined unit may be less than a second inclination angle of the second inclined unit relative to an internal plane in the cap plate.

The case may include a first plane unit extending from the first inclined unit away from the cap plate and a second plane unit extending from the second inclined unit away from the cap plate, the first and second plane units being substantially coplanar with an external plane surface of the cap plate when the cap plate and the case are fastened.

A first width of the first plane unit may be smaller than a second width of the second plane unit.

The first contact region may include an inclined unit and the second contact region includes a stair unit.

The inclined unit may be in the first opposing case side and the stair unit is in the second opposing case side.

The first contact region may include a corresponding inclined unit in the first opposing cap plate side and the second contact region may include a vertical unit in the second opposing cap plate side, the corresponding inclined unit and the vertical unit mating with the inclined unit and the stair unit.

The first contact region includes a first protrusion unit and the second contact region includes a second protrusion unit.

The first and second protrusion units may be in one of the case and the cap plate.

The first and second contact regions may include a first groove unit and a second groove unit in another one of the case and the cap plate, the first and second groove units mating with the first and second protrusion units.

The first and second contact regions may include a first inclined unit and a second inclined unit in another one of the case and the cap plate, the first and second inclined units mating with the first and second protrusion units.

The first and second contact regions may include a first corresponding protrusion unit and a second corresponding protrusion unit in another one of the case and the cap plate, the first and second corresponding protrusion units mating with the first and second protrusion units.

The first protrusion unit may protrude more than the second protrusion unit.

The first and second contact regions may be asymmetric along a central axis in a z-direction through the case and the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
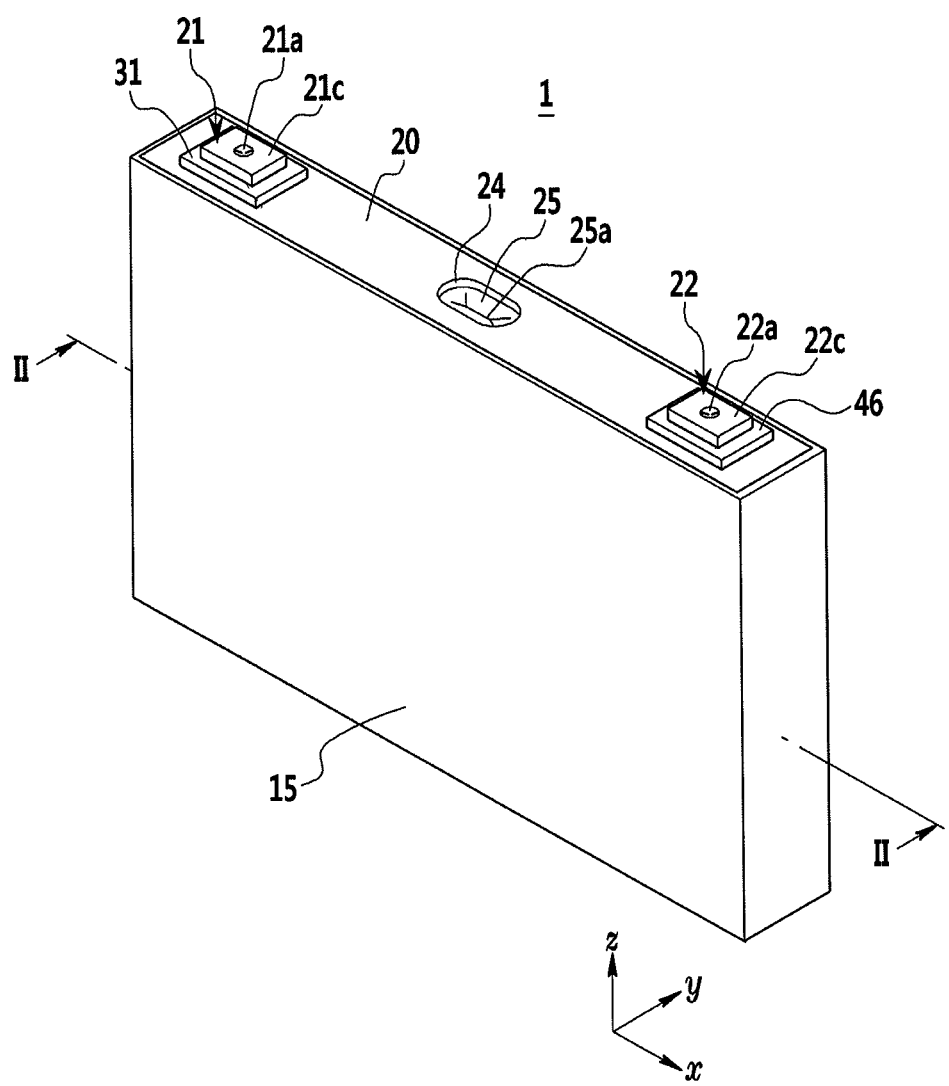
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 2:
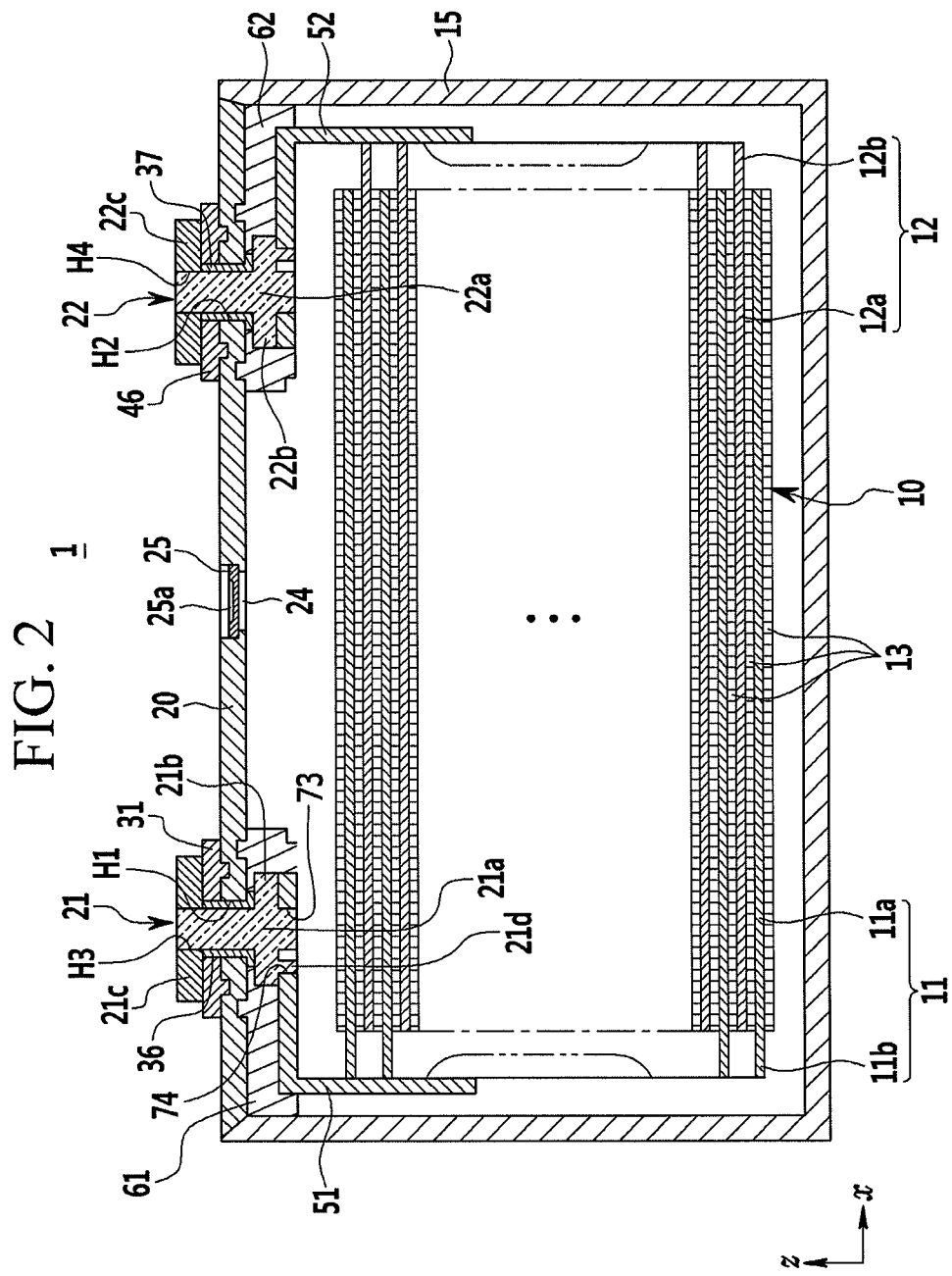
FIG. 2 illustrates a cross-sectional view taken along the line II-II of FIG. 1.

FIG. 1 illustrates a perspective view of a rechargeable battery according to a first exemplary embodiment. FIG. 2 illustrates a cross-sectional view taken along the line II-II of FIG. 1. Referring to FIGS. 1 and 2, a rechargeable battery 1 according to the first exemplary embodiment includes an electrode assembly 10 charging and discharging a current, a case 15 receiving the electrode assembly 10 and an electrolyte solution, a cap plate 20 fastened to an opening of the case 15, and electrode terminals 21 and 22 provided on the cap plate 20.

The electrode assembly 10 may be formed by disposing electrodes (for example, a cathode 11 and an anode 12) on both sides of a separator 13 that is an insulator and winding the cathode 11, the separator 13, and the anode 12 in a jelly roll state.

The cathode and the anode 11 and 12 include coating units 11a and 12a in which an active material is applied on a current collector of a metal plate, and uncoated regions 11b and 12b formed of the current collector which is not coated with the active material, i.e., is exposed.

The uncoated region 11b of the cathode 11 is formed at an end of the cathode 11 along the wound cathode 11. The uncoated region 12b of the anode 12 is formed at an end of the anode 12 along the wound anode 12. In addition, the uncoated regions 11b and 12b are disposed at both ends of the electrode assembly 10.

The case 15 may have a shape of an approximate cuboid so as to form a space receiving the electrode assembly 10 therein. The opening of the case 15 is formed in one side of the cuboid to allow the electrode assembly 10 to be inserted from the outside into an internal space.

The cap plate 20 is provided in the opening of the case 15 to seal the case 15.

For example, the case 15 and the cap plate 20 may be formed of aluminum and welded to each other. That is, after the electrode assembly 10 is inserted into the case 15, the cap plate 20 may be welded to the opening of the case 15.

The cap plate 20 may have one or more openings, e.g., terminal holes H1 and H2 and a vent hole 24. The electrode terminals 21 and 22 may be provided in the terminal holes H1 and H2 of the cap plate 20, respectively, to be electrically connected to the electrode assembly 10.

That is, the electrode terminals 21 and 22 are electrically connected to the cathode 11 and the anode 12 of the electrode assembly 10, respectively. Accordingly, the electrode assembly 10 may be drawn out to the outside of the case 15 through the electrode terminals 21 and 22.

The electrode terminals 21 and 22 include plate terminals 21c and 22c disposed on an external side of the cap plate 20 to correspond to the terminal holes H1 and H2, and rivet terminals 21a and 22a electrically connected to the electrode assembly 10 and fastened to the plate terminals 21c and 22c through the terminal holes H1 and H2.

The plate terminals 21c and 22c have through-holes H3 and H4. The rivet terminals 21a and 22a are inserted into the through-holes H3 and H4 while passing through the terminal holes H1 and H2 at upper ends thereof. The electrode terminals 21 and 22 further include flanges 21b and 22b widely integrated with the rivet terminals 21a and 22a in the cap plate 20.

In a first electrode terminal 21 connected to the cathode 11, an external insulation member 31 interposed between the plate terminal 21c and the cap plate 20 electrically insulates the plate terminal 21c and the cap plate 20. That is, a state where the cap plate 20 is insulated from the electrode assembly 10 and the cathode 11 is maintained.

The insulation member 31 and the plate terminal 21c are coupled with an upper end of the rivet terminal 21a and the upper end is riveted or welded to fasten the insulation member 31 and the plate terminal 21c to the upper end of the rivet terminal 21a. The plate terminal 21c is provided on an external side of the cap plate 20 while the insulation member 31 is interposed therebetween.

At the side of the second electrode terminal 22 connected to the anode 12, a conductive top plate 46 interposed between the plate terminal 22c and the cap plate 20 electrically connects the plate terminal 22c and the cap plate 20. That is, a state where the cap plate 20 is to electrically connected to the electrode assembly 10 and the anode 12 is maintained.

The top plate 46 and the plate terminal 22c are coupled with the upper end of the rivet terminal 22a that is riveted or welded to fasten the top plate 46 and the plate terminal 22c to the upper end of the rivet terminal 22a. The plate terminal 22c is provided on the external side of the cap plate 20 while the top plate 46 is interposed there between.

Gaskets 36 and 37 are provided between the rivet terminals 21a and 22a of the electrode terminals 21 and 22 and internal surfaces of the terminal holes H1 and H2 of the cap plate 20 to seal a space between the rivet terminals 21a and 22a and the cap plate 20 and to electrically insulate the rivet terminals 21a and 22a and the cap plate 20.

The gaskets 36 and 37 may further extend between the flanges 21b and 22b and the internal surface of the cap plate 20 to further seal a space between the flanges 21b and 22b and the cap plate 20 and to electrically insulate the flanges 21b and 22b and the cap plate 20. That is, the gaskets 36 and 37 may prevent leakage of the electrolyte solution through the terminal holes H1 and H2 when the electrode terminals 21 and 22 are provided in the cap plate 20.

Lead tabs 51 and 52 electrically connect the electrode terminals 21 and 22 to the cathode and the anode 11 and 12 of the electrode assembly 10, respectively. That is, the lead tabs 51 and 52 are coupled with lower ends of the rivet terminals 21a and 22a and the lower ends may be secured, e.g., caulked, to connect the lead tabs 51 and 52 to the lower ends of the rivet terminals 21a and 22a while the lead tabs 51 and 52 are supported by the flanges 21b and 22b.

Insulation members 61 and 62 are provided between the lead tabs 51 and 52 and the cap plate 20 to electrically insulate the lead tabs 51 and 52 and the cap plate 20. Further, the insulation members 61 and 62 may be coupled with the cap plate 20 at one side thereof and surround the lead tabs 51 and 52, the rivet terminals 21a and 22a, and the flanges 21b and 22b at another side thereof, thus stabilizing a connection structure thereof.

A vent hole 24 is sealed by a vent plate 25 so as to exhaust internal pressure of the rechargeable battery 1 and generated gas therethrough. When the internal pressure of the rechargeable battery 1 reaches a predetermined pressure, the vent plate 25 is cut to open the vent hole 24. The vent plate 25 may have a notch 25a for inducing cutting.

The rechargeable battery 1 of the first exemplary embodiment includes contact regions or step units between sides of the opening of the case 15 and cap plate sides of the cap plate including corresponding to the case sides, the case sides facing and contacting the cap plate sides at first and second contact regions, respectively. The first and second contact regions may be asymmetric to each other in order to induce safe seating of the cap plate 20 in the opening of the case 15 and prevent over-insertion of the cap plate 20 into the opening when the cap plate 20 is fastened to the opening of the case 15.

For example, the contact regions or step units may be formed on the internal surfaces of the opening of the case 15 to correspond to a portion of the external surfaces of the cap plate 20, and on the external surfaces of the cap plate 20 to correspond to a portion of the internal surfaces of the opening of the case 15. Further, the contact regions or step units may be formed on a portion of the internal surfaces of the opening of the case 15 and/or on a portion of the external surfaces of the cap plate 20 to correspond to each other.

The contact regions or step units may be disposed at both sides in an x-axis direction, e.g., along a length of the cap plate 20, and are asymmetric to each other at opposite sides. For example, the contact regions or step units may be formed on a portion of the internal surfaces of the opening of the case 15 and/or on a portion of the external surfaces of the cap plate 20 to have a shape of at least an inclined surface or a protrusion. Details of different embodiments of the contact regions or step units are provided below.

Figure 3:
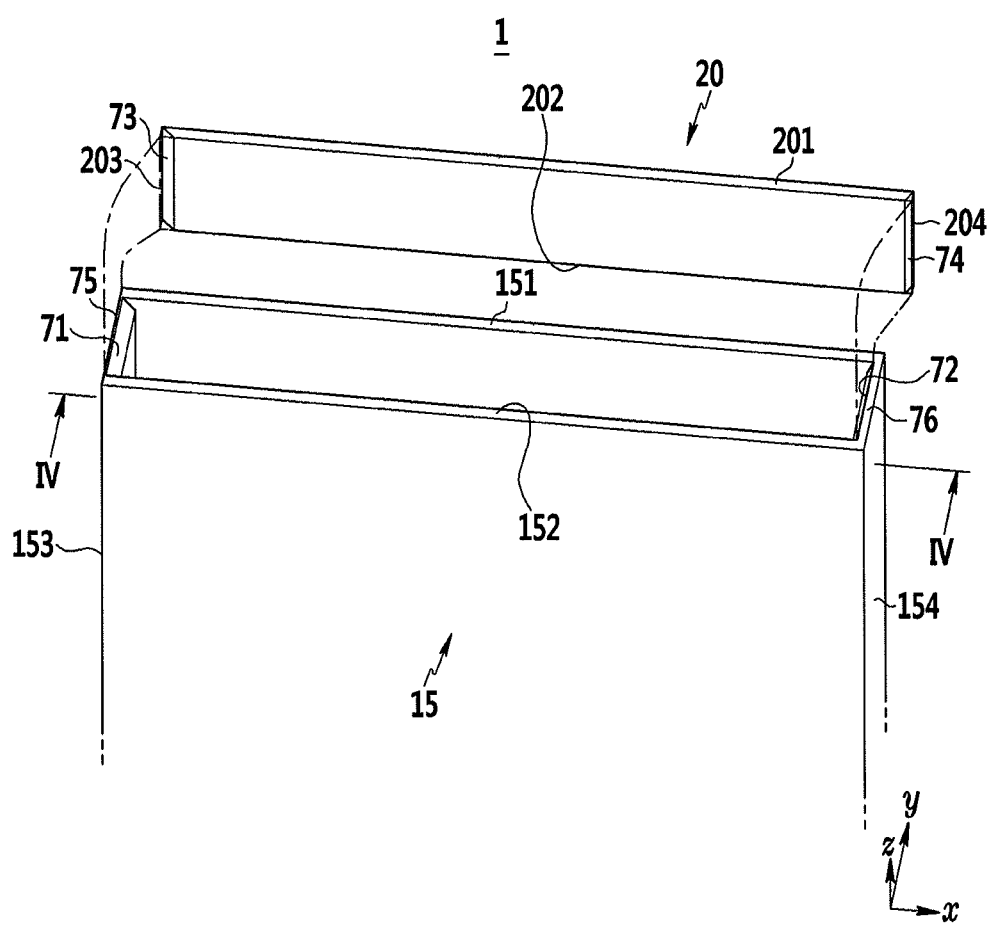
FIG. 3 illustrates an exploded perspective view of a case and a cap plate in the rechargeable battery shown in FIG. 1.
Figure 4:
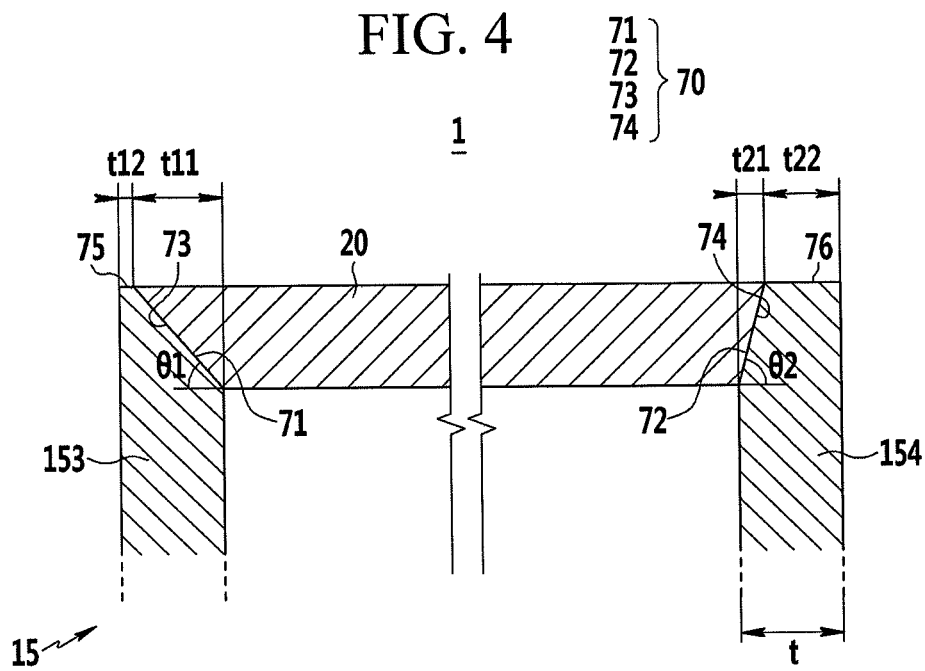
FIG. 4 illustrates a cross-sectional view taken along the line IV-IV of FIG. 3.

FIG. 3 illustrates an exploded perspective view of the case and the cap plate in the rechargeable battery shown in FIG. 1. FIG. 4 illustrates a cross-sectional view taken along the line IV-IV of FIG. 3. Referring to FIGS. 3 and 4, the case 15 has a shape of a cuboid having long lateral sides 151 and 152 and short lateral sides 153 and 154 of an opening. The cap plate 20 has a shape of a quadrangle having long sides 201 and 202 and short sides 203 and 204 corresponding to the opening.

In the first exemplary embodiment, a step unit 70 includes a first inclined unit 71 formed on the short lateral side 153 of the opening at the side of the first electrode terminal 21, and a second inclined unit 72 formed on the short lateral side 154 of the opening at the side of the second electrode terminal 22, which are formed in the opening of the case 15. The first and second inclined units 71 and 72 induce safe seating of the cap plate 20 in the opening.

When the cap plate 20 is provided in the opening of the case 15 having the first and second inclined units 71 and 72, the short lateral sides 203 and 204 of the cap plate 20 are modified and forcibly fastened to the first and second inclined units 71 and 72. In this case, a corresponding inclined unit corresponding to the step unit 70 is formed in the cap plate 20.

That is, the step unit 70 further includes a first corresponding inclined unit 73 formed on the external surface of the short side 203 of the cap plate 20 to correspond to the first inclined unit 71, and a second corresponding inclined unit 74 formed on the external surface of the short side 204 of the cap plate 20 to correspond to the second inclined unit 72. The first and second corresponding inclined units 73 and 74 are formed by modification of the short sides 203 and 204 of the cap plate 20 by the first and second inclined units 71 and 72.

A first inclination angle θ1 of the first inclined unit 71 is set to be smaller than a second inclination angle θ2 of the second inclined unit 72 based on an internal plane of the cap plate 20. That is, the first and second inclined units 71 and 72 are formed to be asymmetric to each other. The first and second inclined units 71 and 72 which are asymmetric to each other prevent over-insertion of the cap plate 20, allowing the cap plate 20 to be safely seated on the case 15.

The case 15 further includes a first plane unit 75 formed on external sides of the first inclined unit 71 and the first corresponding inclined unit 73 corresponding to each other to correspond to the external surface of the cap plate 20, and a second plane unit 76 formed on external sides of the second inclined unit 72 and the second corresponding inclined unit 74 corresponding to each other to correspond to the external surface of the cap plate 20.

In the case 15, thicknesses t of the short lateral sides 153 and 154 are the same as each other. Accordingly, an eleventh thickness t11 of the first inclined unit 71 in the short lateral side 153 of one side is set to be larger than a twenty-first thickness t21 of the second inclined unit 72 in the short lateral side 154 of another side. A twelfth thickness t12 of the first plane unit 75 is set to be smaller than a twenty-second thickness t22 of the second plane unit 76.

For example, the cathode 11 may be formed of copper, and the anode 12 may be formed of aluminum. Accordingly, the first electrode terminal 21 connected to the uncoated region 11b of the cathode 11 having a large specific gravity is heavier than the second electrode terminal 22 connected to the uncoated region 12b of the anode 12.

Accordingly, when the electrode assembly 10 is inserted into the opening of the case 15 while the electrode assembly 10 is connected to the cap plate 20, the cap plate 20 is inclined and receives force to be further inserted into the case 15 at the side of the first electrode terminal 21 as compared to at the side of the second electrode terminal 22. Therefore, one side of the cap plate 20 may be over-inserted into the opening.

In order to prevent over-insertion, the first inclined unit 71 is formed to be gentler than the second inclined unit 72, and a margin at the side of the first electrode terminal 21 is ensured to be larger than a margin at the side of the second electrode terminal 22, so that the cap plate 20 is easily safely seated.

Accordingly, the short side 203 of the cap plate 20 is not over-inserted into the case 15, but may be safely seated on at least the first inclined unit 71. In this case, the short side 204 of the cap plate 20 is safely seated on the second inclined unit 72. That is, the cap plate 20 is not over-inserted into the case 15.

Hereinafter, various exemplary embodiments will be described. The same constitution as the first exemplary embodiment and the aforementioned exemplary embodiment will not be repeated, and the differences between the different embodiments will be described.

Figure 5:
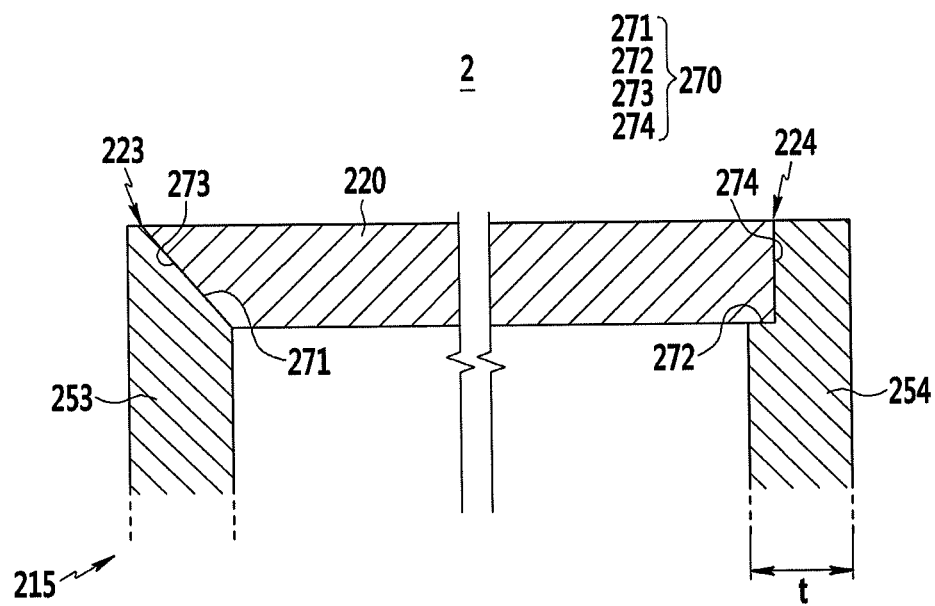
FIG. 5 illustrates a cross-sectional view of a rechargeable battery according to a second exemplary embodiment.

FIG. 5 illustrates a cross-sectional view of a rechargeable battery according to a second exemplary embodiment. Referring to FIG. 5, in a rechargeable battery 2 of the second exemplary embodiment, a step unit 270 is formed in an opening of a case 215. The step unit 270 includes an inclined unit 271 formed on a short lateral side 253 of the opening at the side of the first electrode terminal 21 and a stair unit 272 formed on a short lateral side 254 at the side of the second electrode terminal 22. The inclined unit 271 and the stair unit 272 induce safe seating of a cap plate 220 in the opening.

When the cap plate 220 is provided in the opening of the case 215 having the inclined unit 271 and the stair unit 272, short lateral sides 223 and 224 of the cap plate 220 are modified and forcibly fastened to the inclined unit 271 and the stair unit 272. In this case, a corresponding inclined unit corresponding to the step unit 270 is formed in the cap plate 220.

That is, the step unit 270 further includes a corresponding inclined unit 273 formed on the external surface of the cap plate 220 to correspond to the inclined unit 271, and a corresponding end 274 formed on the external surface of the cap plate 220 to correspond to the stair unit 272. The corresponding inclined unit 273 and the corresponding end 274 are formed by modification of the short sides 223 and 224 of the cap plate 220 by the inclined unit 271 and the stair unit 272.

When the electrode assembly 10 is inserted into the opening of the case 215 while the electrode assembly 10 is connected to the cap plate 220, the cap plate 220 is inclined and receives force to be further inserted into the case 215 at the side of the first electrode terminal 21 as compared to at the side of the second electrode terminal 22. Therefore, one side of the cap plate 220 may be over-inserted into the opening.

In order to prevent over-insertion, the inclined unit 271 is formed to be gentler than the stair unit 272, and a margin at the side of the first electrode terminal 21 is ensured to be larger than a margin at the side of the second electrode terminal 22 so that the cap plate 220 is easily safely seated.

Accordingly, the short lateral side 223 of the cap plate 220 is not over-inserted into the case 215, but may be safely seated on at least the inclined unit 271. In this case, the short lateral side 224 of the cap plate 220 is safely seated on the corresponding end 274. That is, the cap plate 220 is not over-inserted into the case 215.

Figure 6:
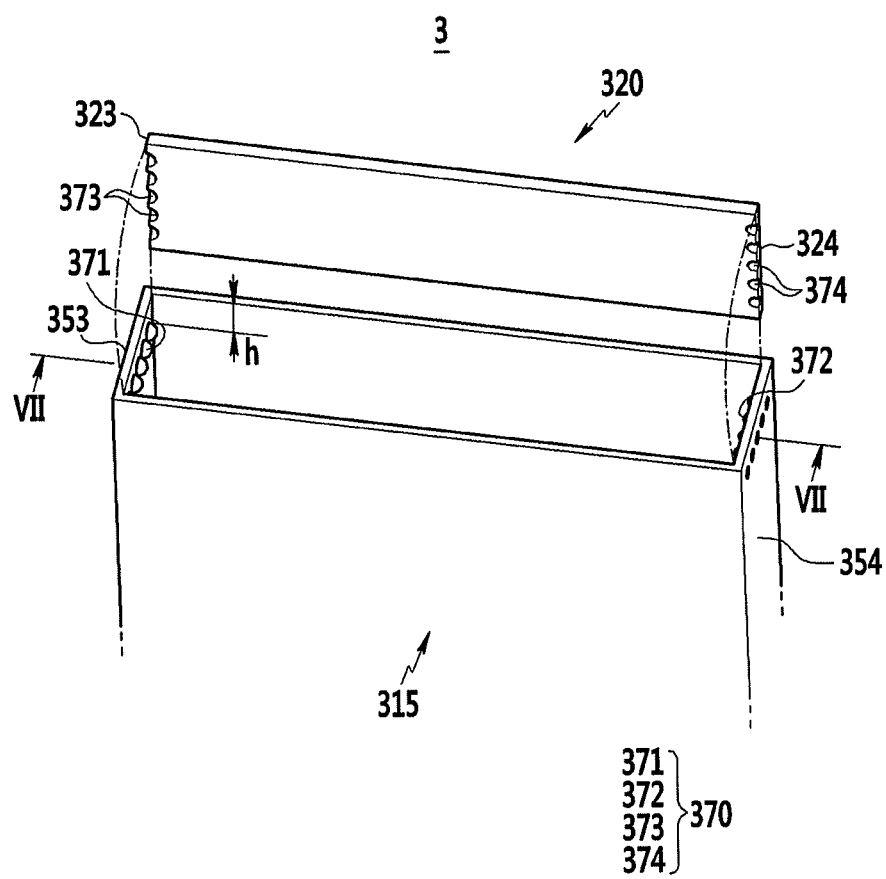
FIG. 6 illustrates an exploded perspective view of a case and a cap plate in a rechargeable battery according to a third exemplary embodiment.
Figure 7:
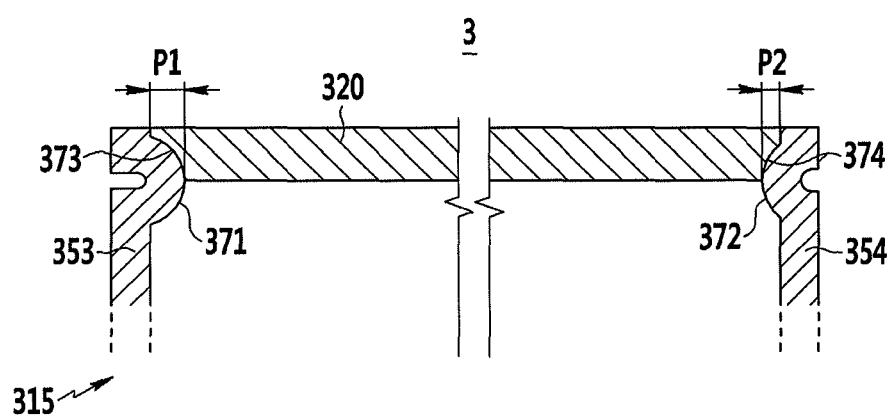
FIG. 7 illustrates a cross-sectional view taken along the line VII-VII of FIG. 6.

FIG. 6 illustrates an exploded perspective view of a case and a cap plate in a rechargeable battery according to a third exemplary embodiment. FIG. 7 is a cross-sectional view taken along the line VII-VII of FIG. 6. Referring to FIGS. 6 and 7, in a rechargeable battery 3 of the third exemplary embodiment, a step unit 370 is formed in a case 315. The step unit 370 includes a first protrusion unit 371 formed on a short lateral side 353 of the opening at the side of the first electrode terminal 21 and a second protrusion unit 372 formed on a short lateral side 354 at the side of the second electrode terminal 22. The first and second protrusion units 371 and 372 induce safe seating of a cap plate 320 in the opening.

When the cap plate 320 is provided in the opening of the case 315 having the first and second protrusion units 371 and 372, short sides 323 and 324 of the cap plate 320 are modified and forcibly fastened to the first and second protrusion units 371 and 372. In this case, a corresponding groove unit corresponding to the step unit 370 is formed in the cap plate 320.

That is, the step unit 370 may further include a first corresponding groove unit 373 formed on the external surface of the cap plate 320 to correspond to the first protrusion unit 371, and a second corresponding groove unit 374 formed on the external surface of the cap plate 320 to correspond to the second protrusion unit 372. The first and second corresponding groove units 373 and 374 are formed by modification of the short sides 323 and 324 of the cap plate 320 by the first and second protrusion units 371 and 372.

When the electrode assembly 10 is inserted into the opening of the case 315 while the electrode assembly 10 is connected to the cap plate 320, the cap plate 320 is inclined and receives force to be further inserted into the case 315 at the side of the first electrode terminal 21 as compared to at the side of the second electrode terminal 22. Therefore, one side of the cap plate 320 may be over-inserted into the opening.

In order to prevent over-insertion, the first protrusion size P1 of the first protrusion unit 371 is set to be larger than the second protrusion size P2 of the second protrusion unit 372 based on an internal plane of the cap plate 320. That is, the first and second protrusion units 371 and 372 are formed to be asymmetric to each other. The first and second protrusion units 371 and 372 which are asymmetric to each other prevent over-insertion of the cap plate 320 to be safely seated.

That is, the first protrusion size P1 is larger than the second protrusion size P2, and a margin at the side of the first electrode terminal 21 is ensured to be larger than a margin at the side of the second electrode terminal 22 so that the cap plate 320 is easily safely seated.

Figure 8:
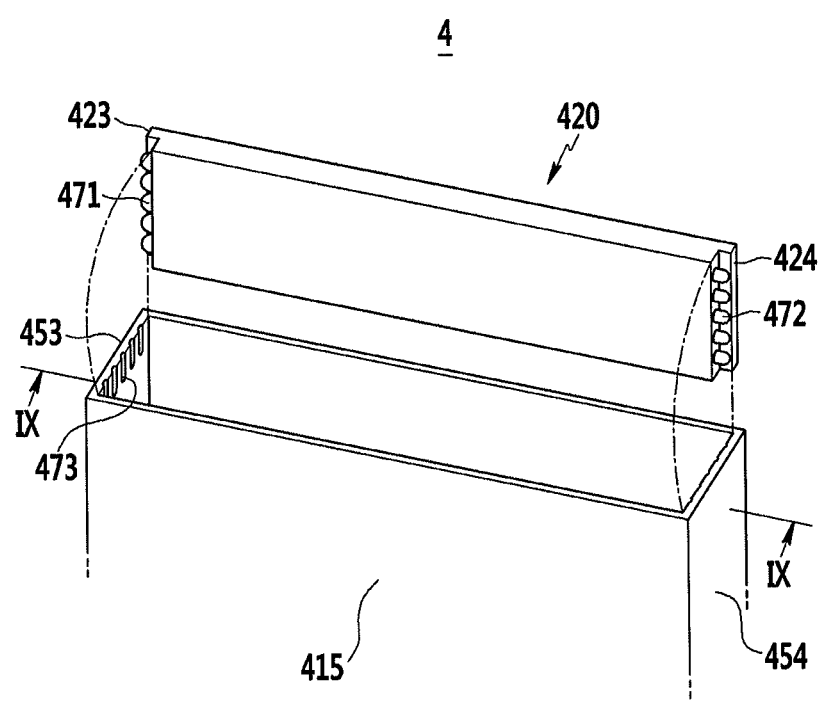
FIG. 8 illustrates an exploded perspective view of a case and a cap plate in a rechargeable battery according to a fourth exemplary embodiment.
Figure 9:
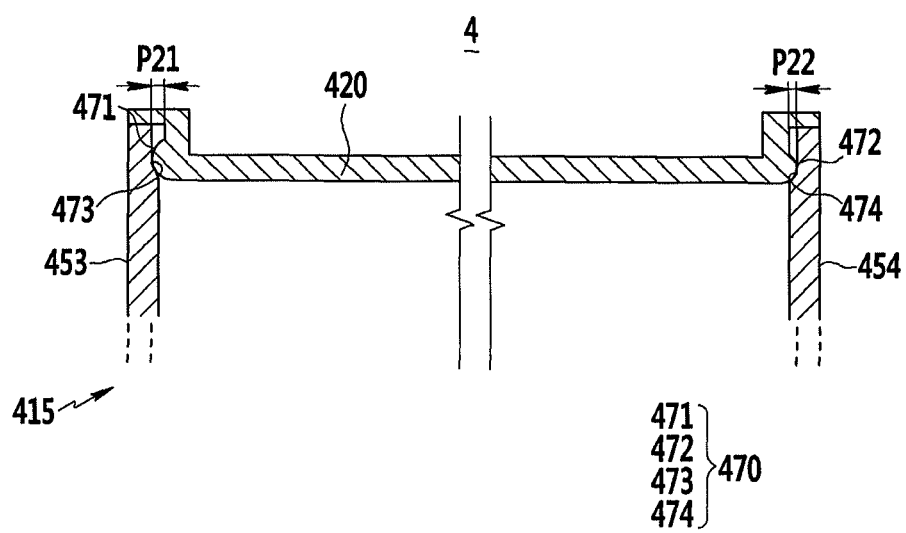
FIG. 9 illustrates a cross-sectional view taken along the line IX-IX of FIG. 8.

FIG. 8 illustrates an exploded perspective view of a case and a cap plate in a rechargeable battery according to a fourth exemplary embodiment. FIG. 9 illustrates a cross-sectional view taken along the line IX-IX of FIG. 8. Referring to FIGS. 8 and 9, in a rechargeable battery 4 of the fourth exemplary embodiment, a step unit 470 is formed in a cap plate 420. The step unit 470 includes a first protrusion unit 471 formed on an external surface of a short side 423 at the side of the first electrode terminal 21 and a second protrusion unit 472 formed on an external surface of a short side 434 at the side of the second electrode terminal 22. The first and second protrusion units 471 and 472 induce safe seating of the cap plate 420 in the opening.

When the cap plate 420 having the first and second protrusion units 471 and 472 is provided in the opening of the case 415, the short lateral sides 453 and 454 of the case 415 are modified and forcibly fastened to the first and second protrusion units 471 and 472. In this case, a corresponding groove unit corresponding to the step unit 470 is formed in the case 415.

That is, the step unit 470 further includes a first corresponding groove unit 473 formed on the short lateral side 453 of the case 415 to correspond to the first protrusion unit 471, and a second corresponding groove unit 474 formed on the short lateral side 454 of the case 415 to correspond to the second protrusion unit 472. The first and second corresponding groove units 473 and 474 are formed by modification of the short lateral sides 453 and 454 of the case 415 by the first and second protrusion units 471 and 472.

When the electrode assembly 10 is inserted into the opening of the case 415 while the electrode assembly 10 is connected to the cap plate 420, the cap plate 420 is inclined and receives force to be further inserted into the case 415 at the side of the first electrode terminal 21 as compared to at the side of the second electrode terminal 22. Therefore, one side of the cap plate 420 may be over-inserted into the opening.

In order to prevent over-insertion, the first protrusion size P21 of the first protrusion unit 471 is set to be larger than the second protrusion size P22 of the second protrusion unit 472 based on the short lateral side 453 of the case 415. That is, the first and second protrusion units 471 and 472 are formed to be asymmetric to each other. The first and second protrusion units 471 and 472 which are asymmetric to each other prevent over-insertion of the cap plate 420 to be inserted and safely seated.

That is, the first protrusion size P21 is larger than the second protrusion size P22, and a margin at the side of the first electrode terminal 21 is ensured to be larger than a margin at the side of the second electrode terminal 22 so that the cap plate 420 is easily safely seated.

Figure 10:
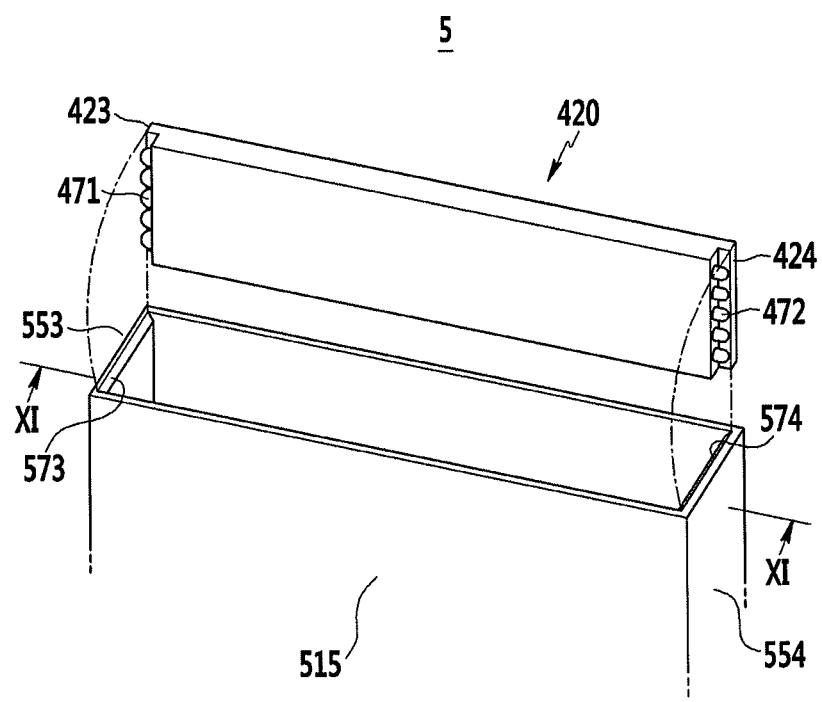
FIG. 10 illustrates an exploded perspective view of a case and a cap plate in a rechargeable battery according to a fifth exemplary embodiment.
Figure 11:
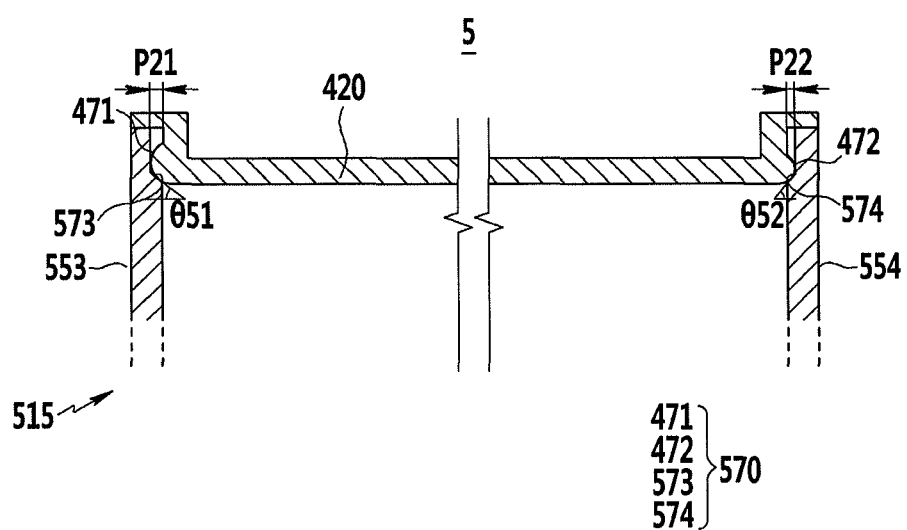
FIG. 11 illustrates a cross-sectional view taken along the line XI-XI of FIG. 10.

FIG. 10 illustrates an exploded perspective view of a case and a cap plate in a rechargeable battery according to a fifth exemplary embodiment. FIG. 11 illustrates a cross-sectional view taken along the line XI-XI of FIG. 10.

Referring to FIGS. 10 and 11, in a rechargeable battery 5 of the fifth exemplary embodiment, a step unit 570 includes the first and second protrusion units 471 and 472 of the fourth exemplary embodiment, a first corresponding inclined unit 573 formed on a short lateral side 553 of a case 515 to correspond to the first protrusion unit 471, and a second corresponding inclined unit 574 formed on a short lateral side 554 of the case 515 to correspond to the second protrusion unit 472.

The first and second protrusion units 471 and 472 and the first and second corresponding inclined units 573 and 574 induce safe seating of the cap plate 320 in the opening.

When the electrode assembly 10 is inserted into the opening of the case 515 while the electrode assembly 10 is connected to the cap plate 420, the cap plate 420 is inclined and receives force to be further inserted into the case 515 at the side of the first electrode terminal 21 as compared to at the side of the second electrode terminal 22. Therefore, one side of the cap plate 420 may be over-inserted into the opening.

In order to prevent over-insertion, the first protrusion size P21 of the first protrusion unit 471 is set to be larger than the second protrusion size P22 of the second protrusion unit 472 based on an internal plane of the cap plate 420. A first inclination angle θ51 of the first corresponding inclined unit 573 is set to be smaller than a second inclination angle θ52 of the second corresponding inclined unit 574 based on the internal plane of the cap plate 420.

That is, the first and second protrusion units 471 and 472 are formed to be asymmetric to each other. The first and second corresponding inclined units 573 and 574 correspond to the first and second protrusion units 471 and 472 and are formed to be asymmetric to each other. The first and second protrusion units 471 and 472 and the first and second corresponding inclined units 573 and 574, which are asymmetric to each other, prevent over-insertion of the cap plate 420 to be safely seated.

That is, the first protrusion size P21 is larger than the second protrusion size P22, and a margin at the side of the first electrode terminal 21 is ensured to be larger than a margin at the side of the second electrode terminal 22 so that the cap plate 420 is easily safely seated.

Figure 12:
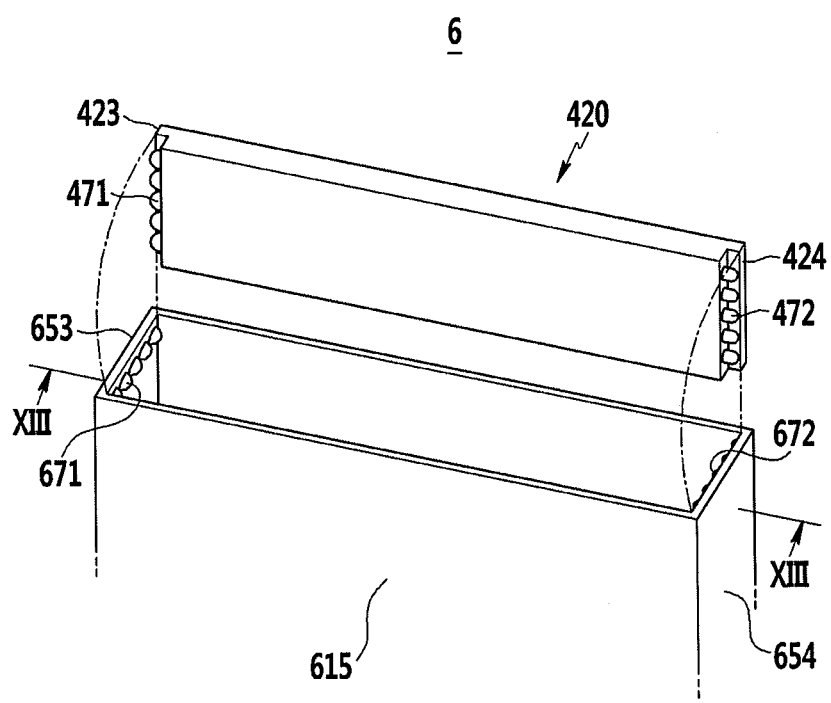
FIG. 12 illustrates an exploded perspective view of a case and a cap plate in a rechargeable battery according to a sixth exemplary embodiment.
Figure 13:
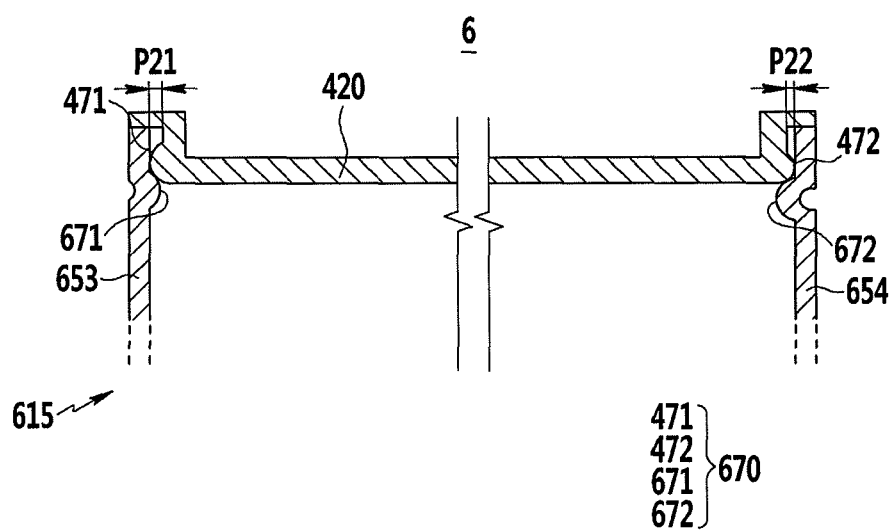
FIG. 13 illustrates a cross-sectional view taken along the line XIII-XIII of FIG. 12.

FIG. 12 illustrates an exploded perspective view of a case and a cap plate in a rechargeable battery according to a sixth exemplary embodiment. FIG. 13 is a cross-sectional view taken along the line XIII-XIII of FIG. 12.

Referring to FIGS. 12 and 13, in a rechargeable battery 6 of the sixth exemplary embodiment, a step unit 670 includes the first and second protrusion units 471 and 472 formed on the cap plate 420 of the fourth exemplary embodiment, a first corresponding protrusion unit 671 formed on a short lateral side 653 of a case 615 to correspond to the first protrusion unit 371, and a second corresponding protrusion unit 672 formed on a short lateral side 654 of the case 615 to correspond to the second protrusion unit 372.

The first and second protrusion units 471 and 472 and the first and second corresponding inclined units 672 and 672 induce safe seating of the cap plate 420 in the opening.

When the electrode assembly 10 is inserted into the opening of the case 615 while the electrode assembly 10 is connected to the cap plate 420, the cap plate 420 is inclined and receives force to be further inserted into the case 615 at the side of the first electrode terminal 21 as compared to at the side of the second electrode terminal 22. Therefore, one side of the cap plate 420 may be over-inserted into the opening.

In order to prevent over-insertion, the first protrusion size P21 of the first protrusion unit 471 is set to be larger than the second protrusion size P22 of the second protrusion unit 472 based on an internal plane of the cap plate 420. The first and second corresponding inclined units 671 and 672 have the same protrusion size.

That is, the first and second protrusion units 471 and 472 are formed to be asymmetric to each other. The first and second protrusion units 471 and 472 which are asymmetric to each other prevent over-insertion of the cap plate 420 to be safely seated.

That is, the first protrusion size P21 is larger than the second protrusion size P22, and a margin at the side of the first electrode terminal 21 is ensured to be larger than a margin at the side of the second electrode terminal 22 so that the cap plate 420 is easily safely seated.

By way of summation and review, when a cap plate is assembled with a case, a step may be formed at a position at which the opening of the case is to be situated by a press process for the purpose of an alignment operation of the case and the cap plate. In addition, the case is molded by deep drawing. However, when the step is formed by a press process, a shape of the step in the opening may be non-uniform due to technical limits of deep drawing. Accordingly, the cap plate cannot be safely seated in the opening and the step of the case, and may be over-inserted into the opening.

In contrast, according to one or more embodiments, step units or contact regions, e.g., including plane units, inclined units, protrusion units, and/or groove units, and so forth, in an opening of a case and/or a cap plate are formed to be asymmetric to each other at opposite sides. Therefore, when the cap plate is fastened to the case, safe seating of the cap plate in the opening of the case is induced and over-insertion of the cap plate into the opening is prevented. For example, the asymmetric contact regions or step units may prevent a side of the cap plate adjacent a first electrode terminal from being further inserted into the case relative to a side of the cap plate adjacent a second electrode terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly; and
a housing for the electrode assembly, the housing including:
  a case having an opening therein, the opening exposing case sides, the case configured to receive the electrode assembly through the opening; and
  a cap plate to seal the case at the opening, the cap plate including cap plate sides corresponding to the case sides, the case sides facing and contacting the cap plate sides at first and second contact regions of the case sides, respectively, the first and second contact regions of the case sides being asymmetric to each other and being in first and second case sides opposite to each other, respectively, the first contact region including a first inclined plane in the first case side, the second contact region including a second inclined plane in the second case side, wherein
  a slope of the first inclined plane in the first case side is different from that of the second inclined plane in the second case opposite to the first case side.

2. The housing as claimed in claim 1, wherein the case is a cuboid and the cap plate is a quadrangle, wherein the first and second case sides are short lateral sides.

3. The housing as claimed in claim 1, wherein the cap plate sides includes first and second cap plate sides, the first cap plate side contacting the first case side, the second cap plate side contacting the second case side.

4. The housing as claimed in claim 1, wherein a fastening margin of the first contact region is larger than a fastening margin of the second contact region.

5. The housing as claimed in claim 1, wherein a second inclination angle of the second inclined plane is an acute angle relative to a bottom plane in the cap plate and a first inclination angle of the first inclined plane is less than the second inclination angle of the second inclined plane relative to the bottom plane in the cap plate.

6. The housing as claimed in claim 1, wherein the case includes a first plane unit extending from the first inclined plane away from the cap plate and a second plane unit extending from the second inclined plane away from the cap plate, the first and second plane units being substantially coplanar with an external plane surface of the cap plate when the cap plate and the case are fastened.

7. The housing as claimed in claim 6, wherein a first width of the first plane unit is smaller than a second width of the second plane unit.

8. A rechargeable battery, comprising:
an electrode assembly; and
a housing for the electrode assembly, the housing including:
  a case having an opening therein, the opening exposing case sides, the case configured to receive the electrode assembly through the opening; and
  a cap plate to seal the case at the opening, the cap plate including cap plate sides corresponding to the case sides, the case sides facing and contacting the cap plate sides at first and second contact regions of the case sides, respectively, the first and second contact regions of the case sides being asymmetric to each other and being in first and second case sides opposite to each other, respectively, wherein:
  the first contact region includes an inclined plane in the first case side, and
  the second contact region includes a stair unit in the second case side opposite to the first case side.

9. The housing as claimed in claim 7, wherein the cap plate sides includes first and second cap plate sides, the first cap plate side including a cap plate inclined plane, the second cap plate side including a cap plate stair unit, the cap plate inclined plane and the cap plate stair unit mating with the inclined plane and the stair unit.

10. A rechargeable battery, comprising:
an electrode assembly; and
a housing for the electrode assembly, the housing including:
  a case having an opening therein, the opening exposing case sides, the case configured to receive the electrode assembly through the opening; and
  a cap plate to seal the case at the opening, the cap plate including cap plate sides corresponding to the case sides, the case sides facing and contacting the cap plate sides at first and second contact regions, respectively, the first and second contact regions being asymmetric to each other and being opposite to each other, respectively, wherein
  the first contact region includes a first protrusion unit and the second contact region includes a second protrusion unit, and wherein
  a size of the first protrusion unit is different from that of the second protrusion unit.

11. The housing as claimed in claim 10, wherein the first and second protrusion units are in one of the case and the cap plate, the first and second contact regions further comprising a first groove unit and a second groove unit in another one of the case and the cap plate, the first and second groove units mating with the first and second protrusion units.

12. The housing as claimed in claim 10, wherein the first and second protrusion units are in one of the case and the cap plate, the first and second contact regions further comprising a first inclined plane and a second inclined plane in another one of the case and the cap plate, the first and second inclined planes mating with the first and second protrusion units.

13. The housing as claimed in claim 10, wherein the first and second protrusion units are in one of the case and the cap plate, the first and second contact regions further comprising a first corresponding protrusion unit and a second corresponding protrusion unit in another one of the case and the cap plate, the first and second corresponding protrusion units mating with the first and second protrusion units.

14. The housing as claimed in claim 10, wherein the first protrusion unit protrudes more than the second protrusion unit.

15. The housing as claimed in claim 1, wherein the first and second contact regions are asymmetric along a central axis in a z-direction through the case and the cap plate.

* * * * *